United States Patent [19]

Lu

[11] Patent Number: 6,097,287
[45] Date of Patent: Aug. 1, 2000

[54] HELMET SAFETY SYSTEM

[76] Inventor: Clive S. Lu, 282 Newbridge Rd., Hicksville, N.Y. 11801

[21] Appl. No.: 09/261,135

[22] Filed: Mar. 3, 1999

[51] Int. Cl.⁷ .................................................. B60Q 1/44
[52] U.S. Cl. ........................ 340/479; 340/468; 340/480; 362/103; 362/106; 362/276
[58] Field of Search .................................. 340/479, 468, 340/480; 362/103, 106, 108, 276

[56] References Cited

U.S. PATENT DOCUMENTS

| | | | |
|---|---|---|---|
| 4,559,516 | 12/1985 | Schott et al. .............................. | 340/73 |
| 4,559,586 | 12/1985 | Slarve ...................................... | 362/106 |
| 4,760,373 | 7/1988 | Reilly ....................................... | 340/134 |
| 4,769,629 | 9/1988 | Tigwell ..................................... | 340/134 |
| 4,891,736 | 1/1990 | Gouda ...................................... | 362/105 |
| 4,956,752 | 9/1990 | Eoglietti .................................... | 362/72 |
| 5,040,099 | 8/1991 | Harris ....................................... | 362/72 |
| 5,207,500 | 5/1993 | Rios et al. ................................ | 362/105 |
| 5,353,008 | 10/1994 | Eikenberry et al. ..................... | 340/479 |
| 5,704,707 | 1/1998 | Gebelein et al. ........................ | 362/106 |
| 5,769,629 | 6/1998 | Nakamura ............................... | 432/242 |
| 5,844,476 | 12/1998 | Chen ....................................... | 340/467 |

*Primary Examiner*—Julie Lieu
*Attorney, Agent, or Firm*—Aquilino, Welsh & Flaxman

[57] ABSTRACT

The vehicle safety system produces a supplemental warning signal when a braking system of an associated vehicle is actuated. The system includes a warning signal coupled to a wire loop and a flux generator adapted to be coupled to the braking system of the vehicle. When the braking system of the vehicle is actuated the flux generator draws current from the vehicle and the flux generator creates flux when the braking system is actuated to power the warning signal.

22 Claims, 3 Drawing Sheets

6,097,287

HELMET SAFETY SYSTEM

BACKGROUND OF THE INVENTION

1. Field of the Invention

The invention relates to helmet safety lights. More particularly, the invention relates to a helmet safety light employing free energy to power the safety light.

2. Description of the Prior Art

Many motor vehicles, and especially, motorcycles, are designed with brake lights which are not easily viewed by approaching traffic. This places motorcycle riders at a distinct safety disadvantage, since an approaching vehicle is less likely to notice their brake lights when they begin to stop.

As a result, there have been a number of rear-end collisions which have resulted in injuries, loss of life, and property damage. Besides the operator of the vehicle trailing behind the motorcycle, it is advantageous to the operators of vehicles behind the trailing vehicle to see that brakes have been applied by a motorcycle operator.

This problem is very similar to prior problems associated with low mounted brake lights on automobiles. The brake lights mounted just above a rear fender are sometimes difficult to see, since drivers generally do not gaze downwardly while they drive.

As a result, attempts have been made to mount safety lights on the helmets of motorcycle riders. These safety lights are commonly actuated when the rider begins to brake or signal for a turn.

Unfortunately, however, current helmet safety lights are difficult to install and inconvenient to use. For example, many systems require that the helmet be physically connected to the vehicle, while other systems require that the helmet and vehicle be matched for proper operation. A need, therefore, exists for a helmet safety system which is simple to install, reliable, and convenient to use. The present invention provides such a helmet safety system.

SUMMARY OF THE INVENTION

It is, therefore, an object of the present invention to provide a vehicle safety system producing a supplemental warning signal when a braking system of an associated vehicle is actuated. The system includes a warning signal coupled to a wire loop and a flux generator adapted to be coupled to the braking system of the vehicle. When the braking system of the vehicle is actuated the flux generator draws current from the vehicle and the flux generator creates flux when the braking system is actuated to power the warning signal.

It is also an object of the present invention to provide a vehicle safety system wherein the flux generator includes an AC converter, an oscillator and an insulated wire.

It is another object of the present invention to provide a vehicle safety system wherein the warning signal is a safety light.

It is a further object of the present invention to provide a vehicle safety system wherein the safety light is an LED.

It is also an object of the present invention to provide a vehicle safety system wherein the warning signal includes means for mounting on an individual riding the vehicle.

It is another object of the present invention to provide a vehicle safety system wherein the warning signal is mounted to a helmet.

It is a further object of the present invention to provide a vehicle safety system wherein the wire loop circles the helmet.

It is also an object of the present invention to provide a vehicle safety system wherein the warning signal is mounted to the rear of the helmet.

It is another object of the present invention to provide a vehicle including a vehicle safety system providing a supplemental warning signal when a braking system of the vehicle is actuated.

Other objects and advantages of the present invention will become apparent from the following detailed description when viewed in conjunction with the accompanying drawings, which set forth certain embodiments of the invention.

DESCRIPTION OF THE PREFERRED EMBODIMENT

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
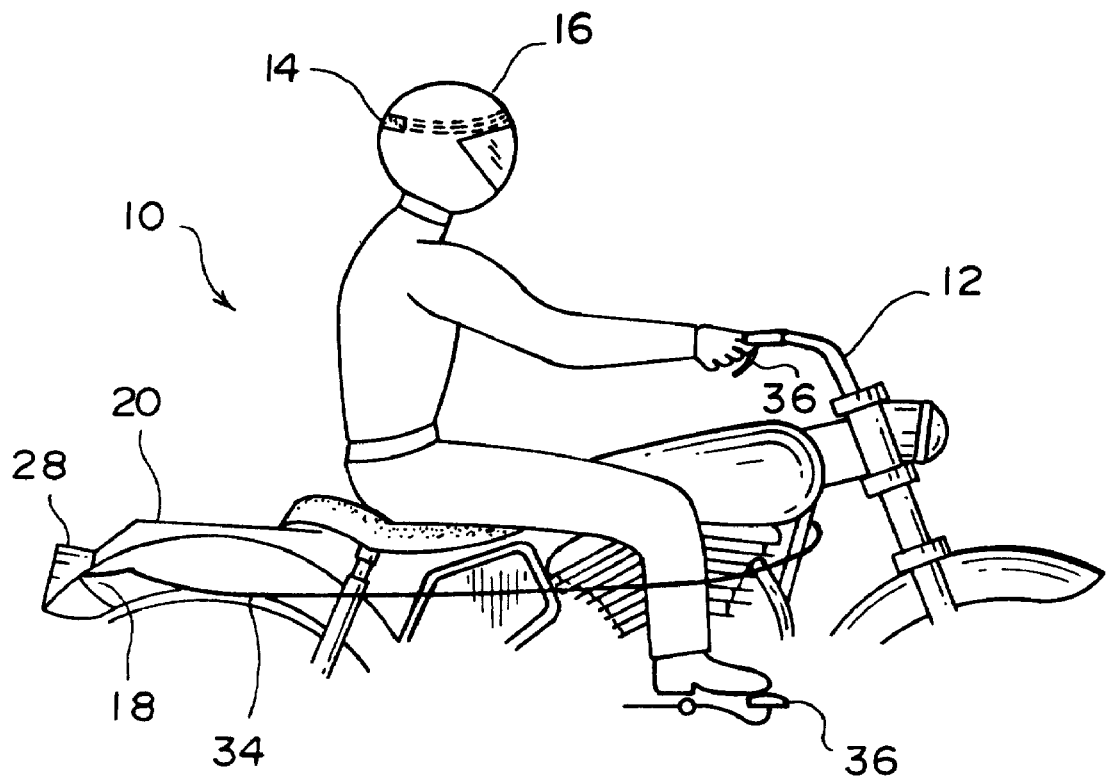
FIG. 1 is a side view of the system in use.

With reference to FIG. 1, a helmet safety system 10 in accordance with the present invention is disclosed. The term "helmet" is used through the body of this specification to refer to protective head gear commonly used by individuals engaging in activities where a dangerous head blow may be encountered. As such, the use of the term helmet throughout the specification should not be considering limiting as it is meant to refer to any type of protective head gear which may be warn to protect individuals from dangerous head blows.

The helmet safety system 10 is designed for use by individuals riding in or on a motor-powered vehicle 12. For example, the system may be used by those individuals riding in automobiles, motorcycles, snowmobiles, jet skis, boats/yachts and/or aircrafts, although the system may be adapted for a wide variety of uses without departing from the spirit of the present invention.

The system 10 allows the rider to warn approaching traffic as to an impending stop by providing a large, highly viewable safety light 14 on the helmet 16 of the rider. Briefly, the helmet safety system 10 employs a safety light 14 mounted to a helmet 16 to warn nearby individuals that the vehicle 12 upon which the helmet wearer is riding is about to come to a stop. Braking of the vehicle 12 signals the safety light 14 and the safety light 14 illuminates to warn nearby individuals of the impending stop.

Referring to FIG. 1, the safety light 14 is integrally mounted within the helmet 16. The safety light 14 is powered by a free energy source and, therefore, does not require the batteries or electrical lines employed in prior helmet warning systems. In fact, with the exception of the flux produced by the flux generator 18 coupled to the braking system 20 of the vehicle 12, the safety light 14 requires no power source at all.

Figure 2:
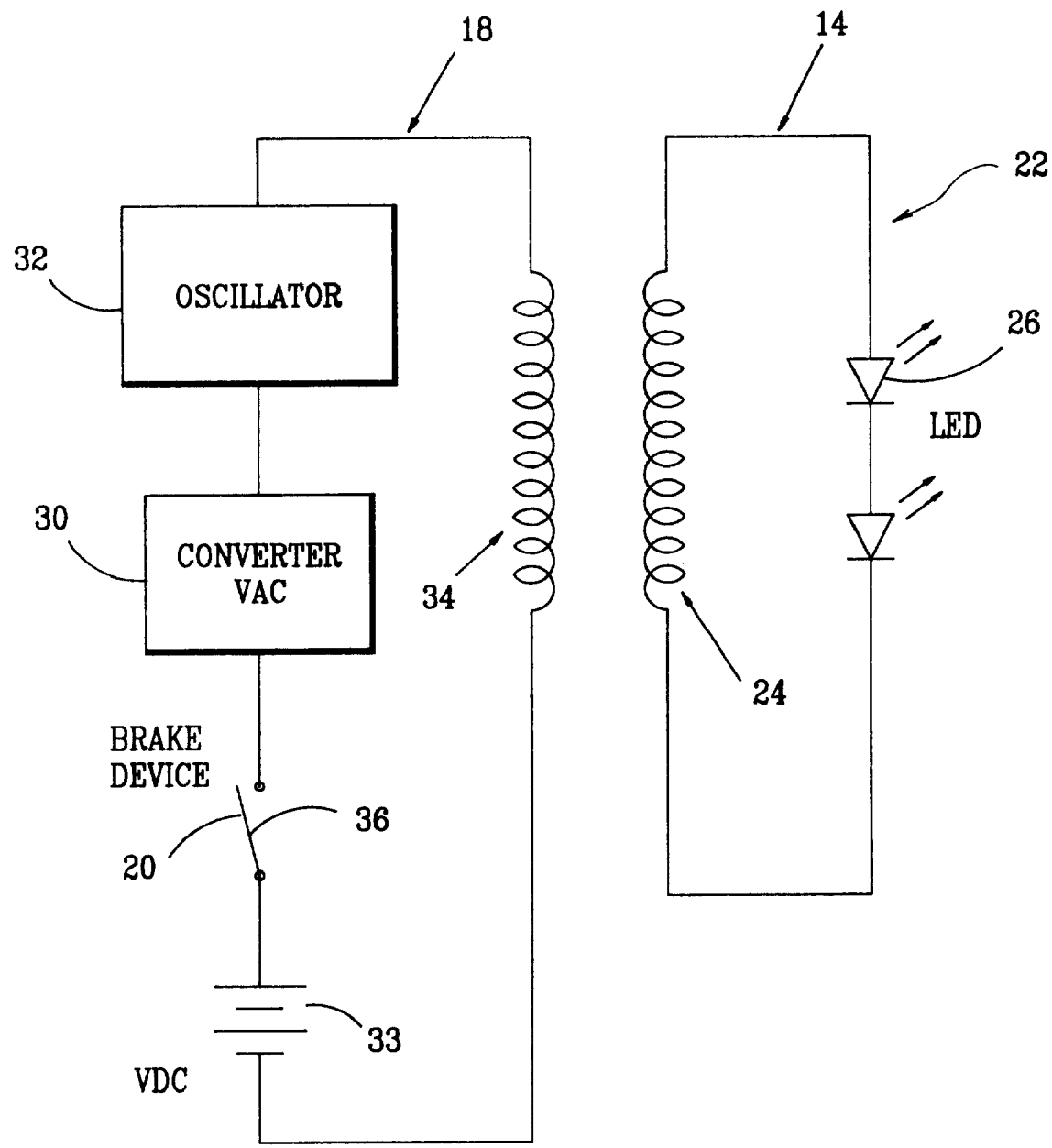
FIGS. 2 and 3 are schematics showing the circuitry employed in the present system.
Figure 3:
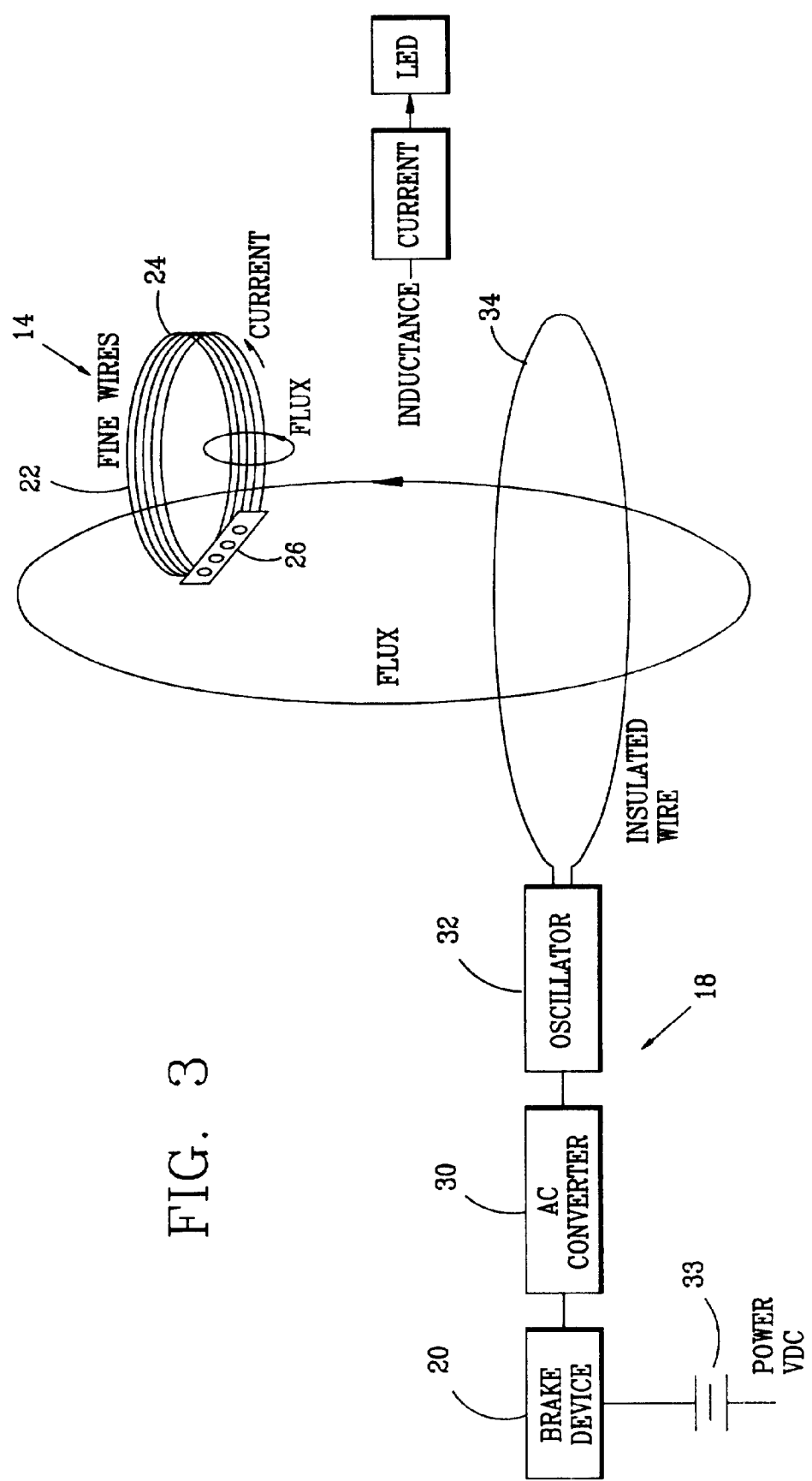

The circuitry 22 for the free energy safety light 14 is disclosed in FIGS. 2 and 3. The safety light 14 includes a plurality of magnetic wire loops 24 coupled to a series of LEDs 26 which emit light upon actuation. The LEDs 26 are actuated when the wire loops 24 are inducted by the flux produced by the flux generator 18 as the brake lights 28 are actuated in a manner that will be discussed in greater detail below. While the disclosed embodiment includes a safety light 14 which is integrally formed with the helmet 16, the safety light 14 may be manufactured as an add-on for attachment to previously manufactured helmets. Similarly, the safety light 14 may be attached to any structure where its light would be helpful in warning individuals that a vehicle is about to stop.

The safety light 14 is powered by the flux produced by a flux generator 18 as the brakes 28 of the vehicle are actuated. Specifically, the flux generator 18 includes an AC converter 30 connected in parallel to the existing braking system 20 of the vehicle 12. The flux generator 18 further includes an oscillator 32 and an insulated wire 34 coupled to the AC converter 30. Since the AC converter 30, oscillator 32 and insulated wire 34 are connected in parallel with the braking system 20 of the vehicle 12, the AC converter 30, oscillator 32 and insulated wire 34 similarly draw current from the battery or the generator 33 of the motor vehicle 12.

In use, when the brakes 28 of a vehicle 12 are triggered, current passes through the AC converter 30, oscillator 32, and insulated wire loop 34, while actuating the brake lights 28. The current passing though the wire loop 34 creates a flux as the braking system 20, and brake lights 28, of the vehicle 12 are actuated.

The flux induces the wire loops 24 of the safety light 14, creating current which powers the series of LEDs 26. When the rider releases the brake trigger 36, the current no longer passes to the brake lights 28, the brake lights 28 go off, the flux disappears, the wire loop 24 is no longer inducted, and the series of LEDs 26 go off.

The free energy powering system employed by the present helmet safety system is based upon the theory of Faraday induction. Specifically, the oscillators oscillate the AC current on the loop insulated wire in the vehicle. The electromagnetic waves change the magnetic flux in the adjacent air. The fine wire loops in the helmet are inducted by the change in the magnetic flux and generate current therethrough, which powers the series of LEDs to warn approaching traffic that the brakes of the vehicle have been actuated.

The present helmet safety system allows individuals to warn approaching traffic of an impending stop without requiring cumbersome batteries or electrical wires connecting the helmet to the vehicle. The present system simply requires that the helmet be placed upon a rider and worn in the vicinity of the vehicle. The flux generated by the braking vehicle powers the safety light to warn approaching traffic that the vehicle, and rider, are coming to a stop. Since the flux will activate any safety light within the vicinity of the vehicle, there is no need to match the safety light with the specific vehicle.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A vehicle safety system providing a supplemental warning signal when a braking system of an associated vehicle is actuated, comprising:
   a warning signal coupled to a wire loop;
   a flux generator, separate and distinct from the wire loop in a manner permitting the warning signal to be freely moved relative to the flux generator, adapted to be coupled to the braking system of the vehicle, such that when the braking system of the vehicle is actuated the flux generator draws current from the vehicle; and
   wherein the flux generator creates flux when the braking system is actuated to power the warning signal.

2. The vehicle safety system according to claim 1, wherein the flux generator includes an AC converter, an oscillator and an insulated wire.

3. The vehicle safety system according to claim 1, wherein the warning signal is a safety light.

4. The vehicle safety system according to claim 3, wherein the safety light is an LED.

5. The vehicle safety system according to claim 1, wherein the warning signal includes means for mounting on an individual riding the vehicle.

6. The vehicle safety system according to claim 5, wherein the warning signal is a safety light.

7. The vehicle safety system according to claim 6, wherein the safety light is an LED.

8. The vehicle safety system according to claim 5, wherein the warning signal is mounted within a helmet.

9. The vehicle safety system according to claim 8, wherein the wire loop circles the helmet.

10. The vehicle safety system according to claim 1, wherein the warning signal is mounted to the rear of the helmet.

11. A vehicle including a vehicle safety system providing a supplemental warning signal when a braking system of the vehicle is actuated, comprising:
    a motor powered vehicle including a braking system;
    a warning signal coupled to a wire loop;
    a flux generator, separate and distinct from the wire loop in a manner permitting the warning signal to be freely moved relative to the flux generator, coupled to the braking system of the vehicle, such that when the braking system of the vehicle is actuated the flux generator draws current from the vehicle; and
    wherein the flux generator creates flux when the braking system is actuated which powers the warning signal.

12. The vehicle according to claim 11, wherein the flux generator includes an AC converter, an oscillator and an insulated wire.

13. The vehicle according to claim 11, wherein the warning signal is a safety light.

14. The vehicle according to claim 13, wherein the safety light is an LED.

15. The vehicle according to claim 11, wherein the warning signal includes means for mounting on an individual riding the vehicle.

16. The vehicle according to claim 15, wherein the warning signal is a safety light.

17. The vehicle according to claim 16, wherein the safety light is an LED.

18. The vehicle according to claim 15, wherein the warning signal is mounted within a helmet.

19. The vehicle according to claim 18, wherein the wire loop circles the helmet.

20. The vehicle according to claim 11, wherein the warning signal is mounted to the rear of the helmet.

21. A vehicle safety system providing a supplemental warning signal when a braking system of an associated vehicle is actuated, comprising:
    a warning signal coupled to a wire loop;
    a flux generator, adapted to be coupled to the braking system of the vehicle, such that when the braking system of the vehicle is actuated the flux generator draws current from the vehicle;

wherein the flux generator includes an AC converter, an oscillator and an insulated wire and the flux generator creates flux when the braking system is actuated to power the warning signal.

22. A vehicle including a vehicle safety system providing a supplemental warning signal when a braking system of the vehicle is actuated, comprising:

a motor powered vehicle including a braking system;

a warning signal coupled to a wire loop;

a flux generator, coupled to the braking system of the vehicle, such that when the braking system of the vehicle is actuated the flux generator draws current from the vehicle;

wherein the flux generator includes and AC converter, an oscillator and an insulated wire and the flux generator creates flux when the braking system is actuated which powers the warning signal.

* * * * *